US009885828B2

(12) United States Patent
Adams et al.

(10) Patent No.: US 9,885,828 B2
(45) Date of Patent: Feb. 6, 2018

(54) OPTICAL WAVEGUIDING PART (71) Applicant: Finisar Sweden AB, Jarfalla (SE)

(72) Inventors: David Adams, Stockholm (SE); Per Granestrand, Tyreso (SE)

(73) Assignee: FINISAR SWEDEN AB, Jarfalla (SE)

( * ) Notice: Subject to any disclaimer, the term of this patent is extended or adjusted under 35 U.S.C. 154(b) by 77 days.

(21) Appl. No.: 14/730,959

(22) Filed: Jun. 4, 2015

(65) Prior Publication Data

US 2016/0356953 A1 Dec. 8, 2016

(51) Int. Cl.
G02B 6/42 (2006.01)
G02B 6/122 (2006.01)
H01S 3/00 (2006.01)
G02B 6/26 (2006.01)
G02B 6/136 (2006.01)
G02B 6/12 (2006.01)

(52) U.S. Cl.
CPC ............... G02B 6/122 (2013.01); G02B 6/26 (2013.01); G02B 6/4207 (2013.01); H01S 3/0064 (2013.01); G02B 6/136 (2013.01); G02B 2006/1209 (2013.01); G02B 2006/12097 (2013.01); G02B 2006/12147 (2013.01); G02B 2006/12159 (2013.01)

(58) Field of Classification Search
CPC .. G02B 2006/1209; G02B 2006/12159; G02B 2006/12097; G02B 6/29344; G02B 6/12002; G02B 6/122; G02B 6/26; G02B 6/2813
See application file for complete search history.

(56) References Cited

U.S. PATENT DOCUMENTS

| 8,532,447 B1 | 9/2013 | Kwakernaak et al. |
| 2003/0003737 A1* | 1/2003 | Delwala ............... G02B 6/1225 438/689 |
| 2003/0012493 A1* | 1/2003 | Lee ........................ G02B 6/10 385/28 |
| 2005/0089262 A1* | 4/2005 | Jenkins .................. G02B 6/122 385/14 |
| 2009/0136190 A1* | 5/2009 | Berini ..................... B82Y 20/00 385/130 |
| 2010/0040323 A1 | 2/2010 | Hamamoto |

(Continued)

OTHER PUBLICATIONS

International Search Report dated Sep. 12, 2016 from corresponding PCT application No. PCT/EP2016/061996.

*Primary Examiner* — Thomas A Hollweg
*Assistant Examiner* — Mary A El Shammaa
(74) *Attorney, Agent, or Firm* — Young & Thompson (57) ABSTRACT Optical waveguiding part (300), which waveguiding part is arranged to convey light through an output facet (30) of the waveguiding part, which waveguiding part comprises a ridge waveguide comprising a semiconductor substrate (320) and a semiconductor light-conveying ridge, wherein the output facet is set at an angle (α) in relation to a main direction (z) of light along the said waveguide, so that light travelling in the waveguide along said main direction has an angle of incidence towards the facet of between 2° and 14° and is reflected towards a first side (301) of the said ridge, wherein the waveguide comprises an MMI (Multi Mode Interferometer) (310), arranged to create an output image substantially at the output facet.

19 Claims, 4 Drawing Sheets

(56) References Cited

U.S. PATENT DOCUMENTS

| | | | |
|---|---|---|---|
| 2012/0163821 A1* | 6/2012 | Kwon | H01S 5/026 398/79 |
| 2013/0223790 A1 | 8/2013 | Jones et al. | |
| 2014/0140655 A1* | 5/2014 | Chakravarty | B82Y 20/00 385/12 |

* cited by examiner

OPTICAL WAVEGUIDING PART

BACKGROUND OF THE INVENTION

Field of the Invention

The present invention relates to an optical waveguiding part comprising an output facet through which light is arranged to travel out from the waveguiding part. In particular, the invention relates to such a waveguiding part providing low reflectivity at the facet, of light travelling along the waveguiding part. For instance, the invention is useful in the case of a semiconductor laser component connected to such a waveguiding part, in particular when light is output through said facet via a modulator.

In many semiconductor optics applications, light traveling through a waveguide needs to be output via a facet, such as to air or to another waveguide or another light-carrying medium. This is in particular the case when coupling an output waveguide from a semiconductor laser to another component, such as a modulating component, or to an optical fiber, possibly via air. One important example of this situation is a laser transmitter component, such as an SFP+ (enhanced Small Formfactor Pluggable) component.

Description of the Related Art

Such facets in general give rise to loss and unwanted reflections. Such reflections are often harmful to the performance characteristics of the laser component.

In order to mitigate this problem, various anti-reflection coatings can be used. Also, the waveguide can be disposed in a direction that is not perpendicular to the facet, whereby the reflected light is directed away from the waveguide direction upon reflection.

However, this approach does not always provide adequate reflection management. For example, in some cases there are geometrical restrictions on the output beam direction for an optical circuit, so that only a modest angle of the waveguide relative to the facet normal inside the chip is permissible, and in this case the associated reduction of modal reflectance may be insufficient. This situation may occur even for a weak shallow rib waveguide, but it is more likely to occur with a deeply etched waveguide that has strong lateral light confinement.

Furthermore, it has been proposed to use a so-called "window" region near the facet. The window region is created by first etching away the waveguide near the facet, and then filling the etched region with transparent material. This allows the light to diffract vertically and horizontally prior to hitting the facet in question, thereby achieving a reduction in the modal facet reflectivity.

BRIEF SUMMARY OF THE INVENTION

The production of such a window region requires separate, additional process steps, and might also give rise to mode shape distortion within the window, which then causes distortions in the near and far field pattern. This, in turn, reduces coupling efficiency, such as to an output lens train or an output optical fiber.

The present invention solves these problems.

Hence, the invention relates to an optical waveguiding part which waveguiding part is arranged to convey light through an output facet of the waveguiding part, which waveguiding part comprises a ridge waveguide comprising a semiconductor substrate and a semiconductor light-conveying ridge, wherein the output facet is set at an angle in relation to a main direction of light along the said waveguide, so that light travelling in the waveguide along said main direction has an angle of incidence towards the facet of between 2° and 14° and is reflected towards a first side of the said ridge, wherein the waveguide comprises an MMI (Multi Mode Interferometer), arranged to create an output image substantially at the output facet.

BRIEF DESCRIPTION OF THE DRAWINGS

In the following, the invention will be described in detail, with reference to exemplifying embodiments of the invention and to the enclosed drawings, in which.

DETAILED DESCRIPTION OF THE PREFERRED EMBODIMENTS

All figures share the same reference numerals for same or corresponding parts. Three-digit reference numerals share their respective last two digits across figures, for denoting corresponding parts. In general, the figures are simplified and not to scale.

The invention generally relates to optical waveguiding parts 100, 200, 300, 400, 500, 600, illustrated in exemplifying fashion in the figures. Such optical waveguiding parts are arranged to convey light through an output facet 30 (broken line) of the waveguiding part in question. Such waveguiding parts are furthermore, in general, arranged to receive light from an input waveguide 10, said light travelling in a main direction of light z, and to deliver such incident light, through the facet 30, to an output waveguide 20, possibly via a volume of air, noble gas or vacuum, or another material, between the facet 30 and the output waveguide 20. Typically, the light output through the facet 30 radiates into air 21, and is then captured by a conventional lens train (not shown in the figures) to focus the light back down into another semiconductor chip; into a glass-based waveguiding chip; or into a fiber 20. In particular, it is preferred that air 21 is present between the facet 30 and the waveguide 20 in the case in which the light is emitted from a laser 40 which is monolithically integrated with a modulator 50, in particular in case the facet 30 is arranged after the modulator 50 in the said main light direction z (see below). In the figures, x is the lateral direction of a ridge waveguide of the waveguiding part, and y is perpendicular to both x and z. Etching of the waveguiding part is typically performed in the negative y direction.

Furthermore, the waveguiding part 100, 200, 300, 400, 500, 600 comprises a ridge waveguide structure comprising a semiconductor substrate 120, 220, 320, 620 and a semiconductor light-conveying ridge. Such ridge waveguides are well known as such, and can for instance use InP/InGaAsP-based semiconductor material systems, that are conventional as such and not described in detail herein. Preferably, the ridge waveguiding structure is formed as a monolithically integrated structure, which may also be integrated, possibly monolithically integrated, with other optical components, such as a laser 40 and a modulator 50 (see FIG. 6 and below). The ridge of the ridge waveguiding structure is preferably, between 1.5 and 6.0 µm, preferably between 4.0 and 5.0 µm, wide.

The output facet 30 is set at an angle α in relation to the main direction of light z along the input waveguide 10, so that light travelling in the input waveguide 10 along said main direction z has an angle of incidence towards the facet of between 2° and 14°. In other words, the angle α as shown in the figures is also between 2° and 14°.

As a result of this angle α, such incident light is reflected towards a first sidewall 101, 201, 301, 401, 501 of the ridge, as opposed to towards a second, opposite side 102, 202, 302, 402, 502 of the ridge.

According to the invention, the input waveguide 10 comprises an MMI (Multi Mode Interferometer) 110, 210, 310, 410, 510, 610, arranged to create an output image substantially at the output facet 30.

Hence, the above said light travelling along the input waveguide 10 along the main direction z and towards the facet 30 passes through the MMI 110, 210, 310, 410, 510, 610 and is imaged onto the facet 30 as a result.

Such a waveguiding part 100, 200, 300, 400, 500, 600 provides very low reflections from the facet 30 and back into the input waveguide 10, which is useful in many situations as described in further detail herein below. In fact, the inventors have discovered that, as compared to the non-MMI case, a reduction of more than an order of magnitude of the output facet optical power reflectance can be achieved using the present invention, in particular with no significant degradation of the coupling to the output waveguide 40, as compared to a conventional waveguide output, in general but in particular in the preferred case that the output waveguide is an optical fiber which is preceded by a lens train in the main light direction z as described above.

It is noted that, for reasons of clarity, the figures are simplified in the sense that, according to Snell's law, since the respective input semiconductor waveguide is angled relative to the facet normal, the output beam will be oriented at an angle which is further off normal. For instance, in case the facet is angled 8° in relation to a plane which is perpendicular to the main direction of light propagation z, in air the output beam will be angled at approximately 26.4° in relation to said plane.

Experimental results in test systems with 1×1 MMI:s have shown that, in addition to a very large reduction in facet reflectivity achieved with such waveguiding parts 100, 200, 300, 400, 500, 600, no significant degradation is detected in the coupling efficiency to an output fiber waveguide 40 when the fiber coupled power is compared to the coupling efficiency obtained with control devices having no MMI at the output facet.

Another practical benefit provided by the present invention is that such an MMI 110, 210, 310, 410, 510, 610 can be obtained by merely modifying the lithographic mask levels for existing fabrication steps for producing the waveguiding part 100, 200, 300, 400, 500, 600. In other words, no new or additional fabrication steps are required in order to introduce the structure of the present invention into an existing optical component design.

The MMI is operable in filtering out most of the first higher order mode of light travelling in the forward or reverse along the main direction z travelling through the MMI 110, 210, 310, 410, 510, 610. As a result, such light having been reflected at the facet 30 and having the $1^{st}$ higher order mode shape is strongly diminished in amplitude on its return journey back through the MMI 110, 210, 310, 410, 510, 610 and onwards to the input waveguide 10. Light reflected from the facet 30 having other higher order transverse mode shapes is also substantially filtered away by the MMI. As a consequence, the total amount of unwanted reflected light power that is returning to the input waveguide 10 is significantly diminished in general, and in particular the amount of light returning to the input waveguide in the fundamental mode from even symmetry higher order modes is still further diminished.

According to a preferred embodiment, the facet 30 angle α is selected so that the said reflected light distribution, from the reflections at the facet 30, has substantially the shape and phase distribution of the said $1^{st}$ higher order mode, which will provide very small disturbing reflected light powers in the fundamental mode of the input waveguide, not only because of the orthogonality of the first order mode to the fundamental mode of the input waveguide, but also because the power within the reflected first order mode itself will have been reduced by the filtering effect from the passage through the MMI.

According to a preferred embodiment, the facet 30 comprises an anti reflection (AR) coating, providing low reflectivity for light that is incident onto the facet 30 along the main direction of propagation z.

Figure 4:
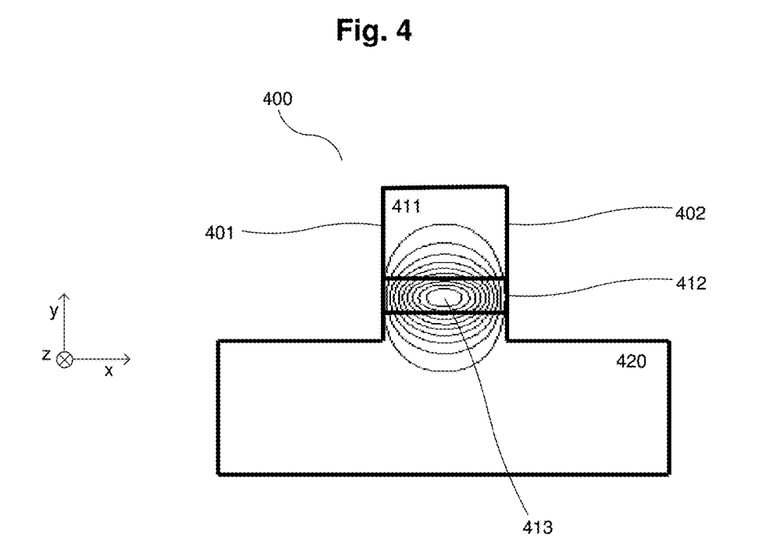
FIG. 4 is a cross sectional view of a first waveguide.
Figure 5:
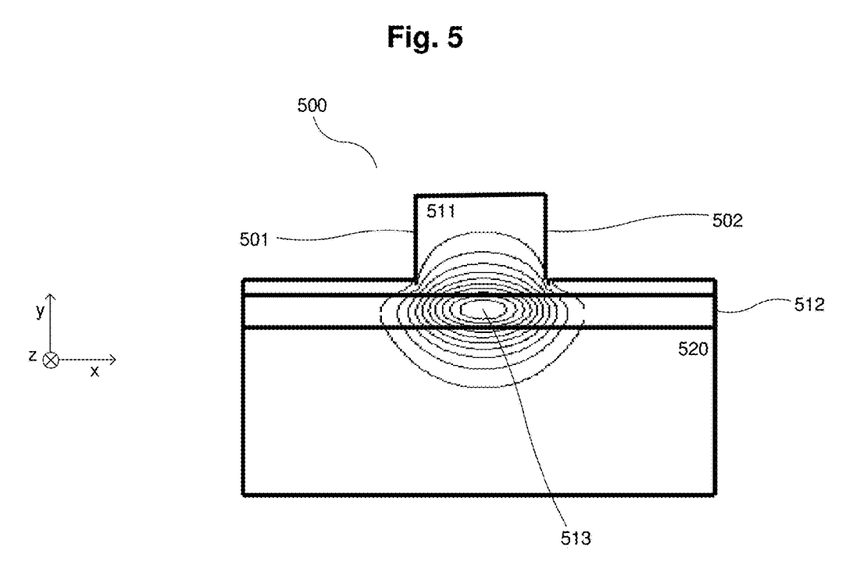
FIG. 5 is a cross sectional view of a second waveguide.

According to an exemplifying embodiment, the input waveguide 10, and preferably the waveguiding part 100, 200, 300, 600 as a whole before the facet 30, is strongly guiding. Herein, that a waveguide is "strongly guiding" is to be interpreted so that the maximum light intensity of light conveyed through the waveguide in question falls within the ridge part of the waveguide as seen in a cross-section of the waveguide, at least in the y direction as shown in the figures. This is illustrated in FIG. 4, in which a light intensity maximum 413 is located inside a waveguiding layer 412 arranged in the ridge part 411 of a waveguide 400, which ridge part has sidewalls 401, 402. In contrast thereto, FIG. 5 illustrates a "weakly guiding" waveguide 500, in which the light intensity maximum 513 lies below, in the y direction, the etched ridge 511, in a waveguiding layer 512.

In one embodiment, the waveguiding part 100, 200, 300, 600 is strongly guiding in general, such as along the input waveguide 10, but not along a possible longitudinal portion 223, 323 of the waveguide near the said output facet 30 featuring a light escape opening such as is described below. In other words, the waveguiding part may be strongly guiding apart from a subsection of the MMI 110, 210, 310, 410, 510, 610.

It is furthermore preferred, as is shown in the figures, that an output end of the MMI 110, 210, 310, 410, 510, 610 substantially coincides with the output facet 30, which is for instance a cleaved or an etched facet. Preferably, the end of the MMI substantially coincides with the location, at least along the z direction, of the output facet. Further preferably, the MMI does not narrow into an output waveguide port at the facet end.

Modern chip cleaving equipment is capable of cleave placement accuracy that can be as good as ±2 µm. Accordingly, the performance of the MMI 110, 210, 310, 410, 510,

610 and a formation of the mode image at the facet 30, or very near to the facet 30, is substantially insensitive to the typical facet cleave position uncertainty in the fabrication process.

Figure 1A:
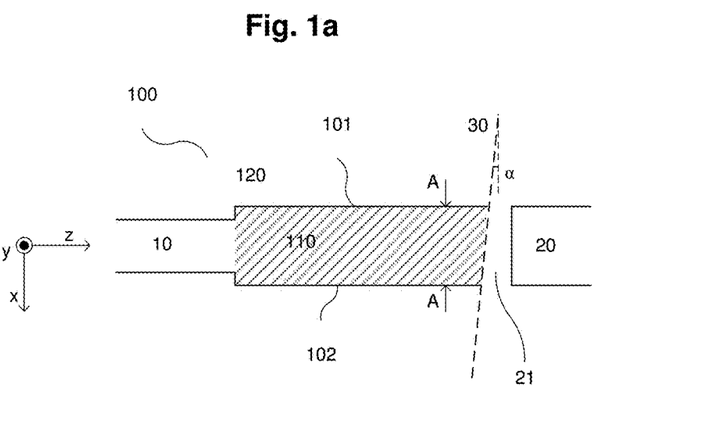
FIG. 1a is a top view of a first preferred optical waveguiding part according to the present invention.
Figure 1B:
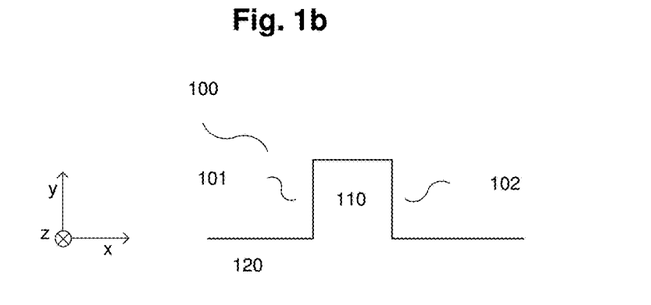
FIG. 1b is a cross sectional view of the said first part along the section A-A.

FIGS. 1a-1b illustrate a first exemplifying waveguiding part 100 design according to the invention, in which the MMI 110 is arranged just before the facet 30, as explained above.

FIGS. 2a-2c, and FIG. 3, illustrate two other preferred examples of the invention, wherein the above discussed ridge waveguide is formed by the semiconductor material at the sidewalls 201, 202; 301, 302 of the ridge being etched down to a certain respective etching depth on either side of the ridge, and according to which the waveguiding part 200, 300 comprises a respective longitudinal portion 223, 323 near the facet 30, along which longitudinal portion 223, 323 a first sidewall portion 221, 321 along said first sidewall 201, 301 of the ridge, is more weakly guiding than along a main portion, such as the rest of the waveguide 10 and/or MMI 210, 310, of the waveguiding part 200, 300 preceding the longitudinal portion 223, 323 in the main direction z, which first sidewall portion 221, 321 admits that light escapes out from the waveguide laterally from the waveguide.

In particular, it is preferred, as is illustrated in the figures, that the first sidewall portion 221, 321, along said first sidewall 201, 301 of the ridge and along said longitudinal portion 223, 323 is etched to a shallower depth than along the said main portion, preferably is not etched at all.

Further preferably, the first sidewall portion 221, 321, along said first sidewall portion 221, 321 of the ridge and along said longitudinal portion 223, 323 is etched to a shallower depth than an opposite, second sidewall portion 224, 324 of the longitudinal portion 223, 323, which second sidewall portion 224, 324 is a subpart of the second sidewall 102, 202 in a way corresponding to the relation between the first sidewall portion 221, 321 and the first sidewall 201, 301. According to one preferred embodiment, the first sidewall portion 221, 321 is not etched at all, and hence has the same height as the ridge top. This is illustrated in FIG. 2d, which is alternative to FIG. 2c but otherwise illustrating the same thing as this figure. In some embodiments, both first 221, 321 and second 224, 324 sidewall can be completely unetched near the facet 30, which facilitate cleaved facet quality.

The structure with the ridge and the sidewalls 201, 202, 221, 224; 301, 302, 321, 324 is illustrated in the top- and cross sectional views of FIGS. 2a, 2b, 2c and 3. In these figures, the area laterally adjacent to the first sidewall portion 221, 321 is etched to a different (shallower) depth than what is the case for the input waveguide 10 and the MMI 210, 310 outside of the portion 223, 323; and the area laterally adjacent to the second sidewall 224, 324 is etched to the same depth as for the input waveguide 10 and the MMI 210, 310 in general. It is, however, realized that different etching depths may be used along different portions of the waveguiding part, as long as the area laterally adjacent to the first sidewall portion 221, 321 is etched to a different depth (or not etched at all) than the area laterally adjacent to the second sidewall portion 224, 324, hence forming an asymmetrically etched longitudinal portion 223, 323.

Such a construction of the first sidewall portion 221, 321 hence forms a light escape opening, admitting light to escape out from the waveguide laterally from the waveguide at the longitudinal portion 223.

In other words, a portion of the MMI 210, 310 sidewall portion 221, 321 in the vicinity of the facet 30 has been removed and replaced by an opening to assist the lateral escape of light that is reflected from the angled facet 30. The removed portion is preferably sufficiently short and near to the output end of the MMI so that the optical image formed at the MMI output is substantially unaffected by the said opening in the MMI sidewall portion 221, 321.

It is preferred that the first sidewall portion 221, 321 is etched to a depth along the longitudinal portion 223, 323 which etch depth does not extend past the above discussed light intensity maximum as viewed in a cross section of the waveguide. In other words, the light intensity maximum along the y direction falls within the non-etched waveguide in reference to that one of the sides which is etched more shallowly (or not etched at all).

Preferably, the longitudinal portion 223, 323 extends substantially all the way to the output facet 30.

Figure 2A:
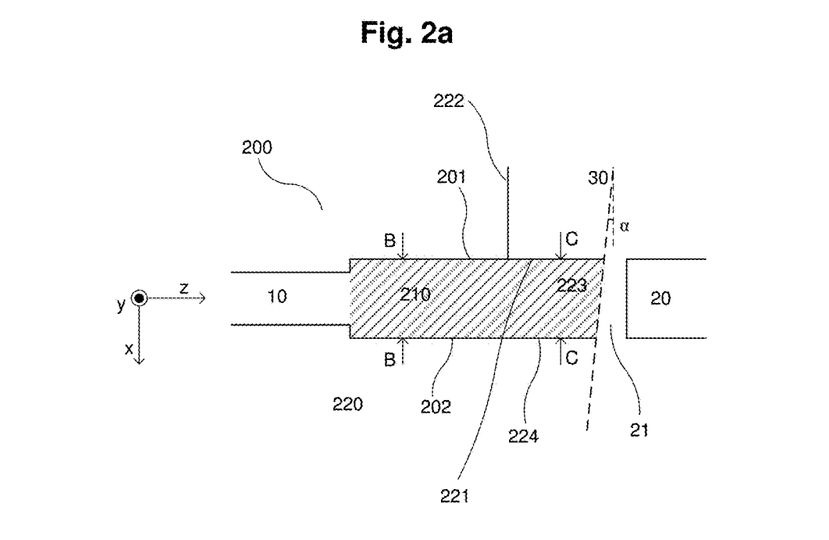
FIG. 2a is a top view of a second preferred optical waveguiding part according to the present invention.
Figure 2B:
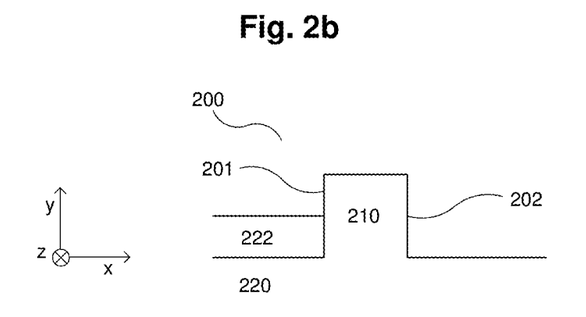
FIG. 2b is a cross sectional view of the said second part along the section B-B.
Figure 2C:
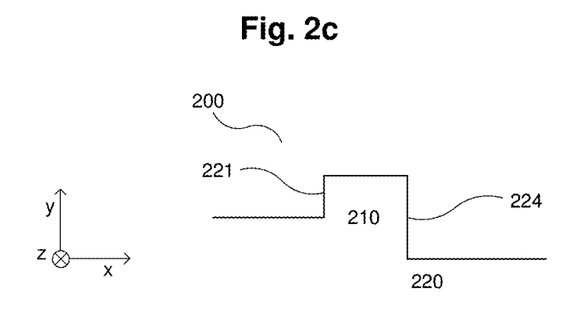
FIG. 2c is a cross sectional view of the said second part along the section C-C.
Figure 2D:
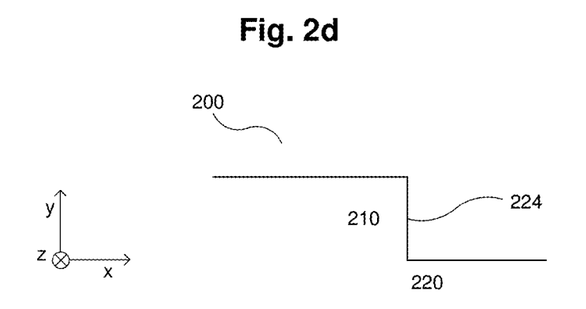
FIG. 2d is a cross sectional view of the said second part along the section C-C, according to an alternative embodiment of the invention.
Figure 3:
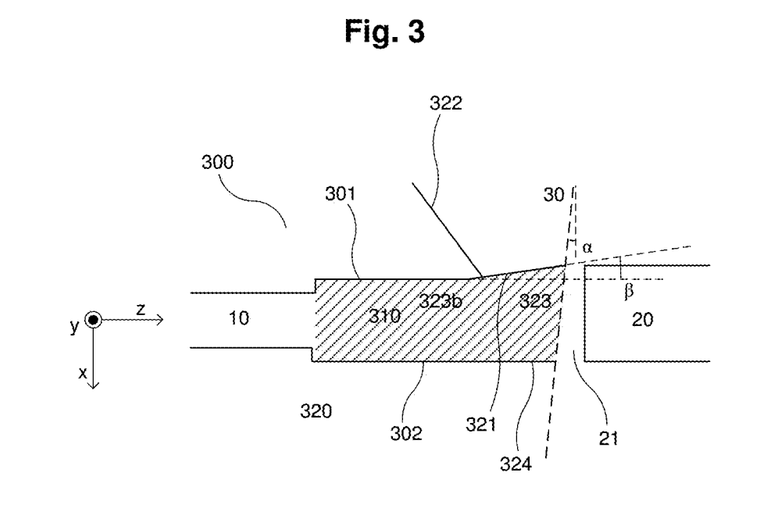
FIG. 3 is a top view of a third preferred optical waveguiding part according to the present invention.

FIG. 2b illustrates a sidewall 222 of the shallowly etched part along the said portion 223 (as seen from the left-hand side in FIG. 2a in the cross-sectional view of FIG. 2b). As is clear from FIG. 2b, the etch along the first sidewall portion 221 is shallower than along the second sidewall 224. The corresponding situation is shown in FIG. 3, where there is a sidewall 322. As mentioned above, in one preferred embodiment the ridge is not etched at all at the first sidewall portion 221, 321 along the longitudinal portion 223, 323, so that the ridge extends laterally x, substantially perpendicularly to the main light direction z along the portion 223, 323, effectively removing the first sidewall portion 221, 321 altogether. This provides good reflection management in certain applications, and may also provide simpler manufacturing.

The sidewall 222 in FIG. 2a is substantially perpendicular to the main light direction z, extending substantially along the (negative) lateral direction x. However, as is illustrated in FIG. 3, the sidewall 322 may extend at a non-perpendicular angle to the main light direction z, in particular in a direction away from the facet 30 as the sidewall 222 extends away from the longitudinal portion 323.

Furthermore, in FIG. 2a, the first sidewall portion 221 is rectilinear. This is preferred in many applications, since it provides for a simple design. However, and as shown in FIG. 3, according to a preferred embodiment the first sidewall 321 is not rectilinear. In particular, the first sidewall 321 along the longitudinal portion 323 is not collinear with the first sidewall 321 along a longitudinal portion 323b of the waveguide adjacent to the longitudinal portion 323. In other words, the first sidewall 321 changes direction along its path along the MMI 310. Preferably, the angled segment of the first sidewall 321 is rectilinear, but it may also be at least partwise curvilinear, or may comprise more than one rectilinear segment oriented in different directions. Preferably, it extends substantially along the same longitudinal portion 323 as the above described asymmetric sidewall etch, but the angled segment may extend slightly past the asymmetric etch portion as seen in the z direction away from the facet 30 (illustrated in FIG. 3).

According to a very preferred embodiment, the first sidewall 321, at least the above discussed angled segment of the same, is set at an angle $\beta$ of 3-10°, preferably 7-9°, in relation to the main light direction z, so that the ridge part widens laterally and continuously along the portion towards the output facet. As is illustrated in FIG. 3, the second sidewall 324 is preferably straight, but it may also comprise one or several angled segments, in particular providing a laterally expanding MMI 310 leading up to the facet 30.

The said angle $\beta$ will provide a reflecting surface along the first side wall 321 reflecting light reflected by the facet 30 back into the MMI 310 and thereafter into the input waveguide 10. Such double-reflected light can provide some degree of destructive interference with light only reflected at the facet 30, further diminishing disturbing reflections from the facet 30.

In a particularly preferred embodiment, the angle β of the first sidewall 321 along the said longitudinal portion 323 is selected, in relation to the angle α of incidence of the light toward the facet 30, so as to give rise to such destructive interference between, firstly, light reflected by the output facet 30 and then by said first sidewall 321 along an angled segment thereof, and, secondly, light reflected by the output facet 30 but not the first sidewall 321. Preferably, the angle β is selected to provide maximal such destructive interference given a certain angle α and a certain light wavelength, and possibly also for a certain index contrast along the sidewall portion 321.

Namely, in a further preferred embodiment, a certain solid material, preferably a semiconductor material, is arranged adjacent to the ridge, such that the first sidewall 321 along the longitudinal portion 323 is defined by the transition surface between the certain solid material and the ridge material. In this case, the index contrast between the certain solid material and the ridge material is preferably selected to be different along the longitudinal portion 323 than along a corresponding index contrast along the rest of the first sidewall 301.

According to a preferred embodiment, the index contrast of the sidewall portion 321 along the longitudinal portion 323 is selected, together with the angle β, for a given angle α and a certain light wavelength, to provide maximal destructive reflectance of the type described above.

To optimize the choice of the MMI reflective sidewall 321 angle and the magnitude of the reflection along that wall, consideration must be given to the size of the mode image that is formed at the output facet 30. A very compact image will correspond to a relatively divergent spectrum of constituent plane waves, while a larger mode image will correspond to a more collimated plane wave emission spectrum. In the former case, a larger fraction of the reflected mode energy will be directed back toward the input waveguide without reflection from the sidewall 321, such that a relatively large sidewall reflectivity might be required to achieve an effective destructive interference between the sidewall-reflected portion of the beam, and the portion that is not sidewall-reflected. Conversely, for larger and more collimated beam images, the majority of the reflected light spectrum will be directed toward the partly reflective sidewall 321, such that a weaker reflection at that wall, or possibly no reflection at all (no etch of the sidewall portion 321), will constitute the appropriate choice for that boundary. With regard to the choice of the reflective amplitude along that section of the wall, this can be selected by the depth of the etch of the waveguide along the sidewall 321 and/or the magnitude of the index contrast along it.

The etch depth and material contrast will also influence the relative optical phase of the reflection from sidewall portion 321.

Preferably, the MMI 110, 210, 310, 410, 510, 610 is a 1×1 MMI. However, it is also possible to use, in particular in certain more complex applications, an MMI component featuring more than one input port and/or more than one output port, as long as the light is imaged onto the facet substantially in the vicinity of the facet position, in order to minimize reflections and losses. Using an MMI component with multiple outputs hence implies arranging the output image from one of the MMI output ports on the facet 30.

In all the exemplifying embodiments described above, the first sidewall portion 221, 321 is etched more shallowly than the second sidewall portion 224, 324 (or not etched at all), forming an escape path for light reflected at the facet 30. It is, however, realized that in some embodiments, there may be a shallow (or no) etch arranged also along the second sidewall portion 224, 324, or the second sidewall portion 224, 324 may be arranged in any other way, as long as the escape functionality of the first sidewall portion 221, 321 is not deteriorated as a consequence.

Furthermore, it is preferred that the said output image on the facet 30 is located substantially in the center of a cross-section of the waveguide. This achieves that the light incident through the MMI 110, 210, 310, 410, 510, 610 strikes the facet 30 well away from the MMI waveguide sidewalls, thereby avoiding possible localized AR coating thickness non-uniformities or possible cleave-induced non-idealities at the waveguide sidewalls.

Moreover, it is preferred that the above described longitudinal portion 223, 323 is arranged along such a short part of the waveguiding part, and so close to the output facet 30, so that the said output image is substantially unaffected by the existence of the longitudinal portion 223, 323 as such. For instance, in case the MMI 110, 210, 310, 410, 510, 610 is about 100 μm, such as 95.3 μm, of length in the z direction, the longitudinal portion 223, 323 featuring the above described asymmetric etch is preferably maximally about 20 μm of length in the z direction. Preferably, the length of the longitudinal portion 223, 323 is maximally about 25% of the total MMI 110, 210, 310, 410, 510, 610 length in the z direction, in particular in the case of a 1×1 MMI. For other types of MMI:s, the length of the longitudinal portion 223, 323 featuring the above described asymmetric etch is preferably such that the image formation at the facet is substantially undistorted when compared to a corresponding fully intact MMI, and the image is preferably at least sufficiently undistorted so as to provide sufficient optical coupling to the subsequent optics.

Figure 6:
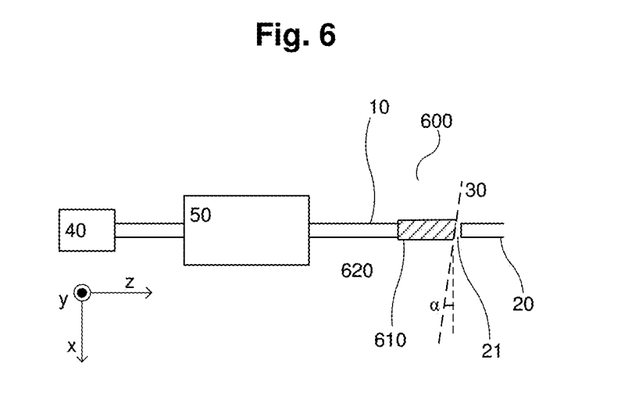
FIG. 6 is a top view of an optical waveguiding part according to the invention, in an optical circuit.

FIG. 6 illustrates a preferred setup, in which the waveguide of the waveguiding part is arranged to carry light output from a semiconductor laser 40. FIG. 6 further illustrates the preferred case in which the waveguide of the waveguiding part is arranged to carry light output from an optical modulator 50, such as an MZ (Mach-Zehnder) modulator. The laser 40 and the modulator 50 may be used in isolation or in combination. The present low-reflectance waveguiding part 100, 200, 300, 400, 500, 600 provides for attractive operating conditions for such components 40, 50, that may be sensitive to reflected light.

Above, preferred embodiments have been described. However, it is apparent to the skilled person that many modifications may be made to the described embodiments without departing from the basic idea of the invention.

For instance, many different detail edgeometries can be considered, apart from the ones illustrated in FIG. 2a-3, regarding the design of the asymmetric etch; the first sidewall portion 221, 321 and the sidewall 222, 322. Such geometries may comprise curvilinear or rectilinear parts with various angles and extensions, as long as the selected angles α and β together provide a particular desired low reflections.

One particularly attractive application of the waveguiding part according to the present invention is as a subpart of an SFP+ component comprising, or feeding light emitted from, a semiconductor laser and preferably also comprising a modulator modulating the light emitted by the said laser, in particular such an SFP+ transmitter in the form of an integrated optical circuit in turn comprising said laser and modulator.

Hence, the invention is not to be limited to the described embodiments, but is variable within the scope of the enclosed claims.

The invention claimed is:

1. An optical waveguiding part configured to convey light through an output facet of the waveguiding part, the waveguiding part comprising:
a ridge waveguide comprising
a semiconductor substrate,
a semiconductor light-conveying ridge, and
a Multi Mode Interferometer (MMI) configured to create an output image substantially at the output facet, an output end of the MMI substantially coinciding with the output facet,
wherein the output facet is set at an angle ($\alpha$) in relation to a main direction (z) of light along the waveguide, so that light travelling in the waveguide along said main direction has an angle of incidence towards the facet of between 2° and 14° and is reflected towards a first side of the ridge.

2. The optical waveguiding part according to claim 1, wherein the ridge waveguide is formed by the semiconductor material on the sides of the ridge being etched down to a certain respective etching depth on either side of the ridge, and
the waveguiding part further comprises a longitudinal portion near the output facet along which a first sidewall portion, along said first side of the ridge, is more weakly guiding than along a main portion of the waveguiding part preceding the longitudinal portion in the main direction (z), the first sidewall portion allowing light to escape out from the waveguide laterally from the waveguide.

3. The optical waveguiding part according to claim 2, wherein the first sidewall portion, along said first side of the ridge and along said longitudinal portion, is etched to a shallower depth than along the The optical main portion.

4. The optical waveguiding part according to claim 2, wherein the first sidewall portion, along said first side of the ridge and along said longitudinal portion, is etched to a shallower depth than an opposite, second sidewall portion.

5. The optical waveguiding part according to claim 1, wherein the waveguide is configured such that the maximum light intensity of light conveyed through the waveguide falls within the ridge part of the waveguide in a cross-section view of the waveguide, separate from along a longitudinal portion of the waveguide near the output facet.

6. The optical waveguiding part to claim 3, wherein the first sidewall portion is etched to an etch depth along the longitudinal portion that does not extend past the maximum intensity of light.

7. The optical waveguiding part according to claim 3, wherein the longitudinal portion extends up to the output facet.

8. The optical waveguiding part to claim 3, wherein the ridge is not etched at all at the first side portion along the longitudinal portion, so that the ridge extends laterally, substantially perpendicularly to the main light direction (z), at the first sidewall portion.

9. The optical waveguiding part according to claim 3, wherein the first sidewall portion along the longitudinal portion is not collinear with the first sidewall along a longitudinal portion of the waveguide adjacent to said longitudinal portion.

10. The optical waveguiding part according to claim 9, wherein the first sidewall portion is set at an angle ($\beta$) of 3-10° in relation to the main light direction (z), so that the ridge part widens laterally and continuously along the longitudinal portion towards the output facet.

11. The optical waveguiding part according to claim 3, wherein an angle ($\beta$) of the first sidewall portion along said longitudinal portion is selected, in relation to said angle of incidence, to create destructive interference between light reflected by the output facet and then by the first sidewall portion, and light reflected by the output facet but not the first sidewall portion.

12. The optical waveguiding part according to claim 10, wherein a certain solid material is arranged adjacent to the ridge, such that the first sidewall portion is defined by the transition surface between the certain material and the ridge material, and the index contrast between the certain material and the ridge material is different along the longitudinal portion than a corresponding index contrast between the certain material and the ridge material along the rest of the first sidewall.

13. The optical waveguiding part according to claim 1, wherein the MMI is a 1×1 MMI.

14. The optical waveguiding part according to claim 13, wherein the output image is located substantially in the center of a cross-section of the waveguide.

15. The optical waveguiding part according to claim 3, wherein the longitudinal portion is disposed along a short part of the waveguide and close to the output facet so that the output image is substantially unaffected by the longitudinal portion.

16. The optical waveguiding part according to claim 13, wherein the longitudinal portion is disposed along a part of the waveguide which occupies at most 25% of the total length of the MMI.

17. The optical waveguiding part according to claim 1, wherein the waveguide carries light output from a semiconductor laser.

18. The optical waveguiding part according to claim 1, wherein the waveguide carries light output from a modulator.

19. The optical waveguiding part according to claim 3, wherein the first sidewall portion, along said first side of the ridge and along said longitudinal portion, is etched to a shallower depth than an opposite, second sidewall portion.

* * * * *